(12) United States Patent
Kukkonen et al.

(10) Patent No.: US 11,981,047 B2
(45) Date of Patent: *May 14, 2024

(54) METHOD OF TREATING WOOD MATERIALS

(71) Applicant: Palonot Oy, Espoo (FI)

(72) Inventors: Jari Kukkonen, Espoo (FI); Timo Nissinen, Espoo (FI)

(73) Assignee: Palonot Oy, Espoo (FI)

(*) Notice: Subject to any disclaimer, the term of this patent is extended or adjusted under 35 U.S.C. 154(b) by 194 days.

This patent is subject to a terminal disclaimer.

(21) Appl. No.: 17/272,957

(22) PCT Filed: Sep. 10, 2019

(86) PCT No.: PCT/FI2019/050648
§ 371 (c)(1),
(2) Date: Mar. 3, 2021

(87) PCT Pub. No.: WO2020/053483
PCT Pub. Date: Mar. 19, 2020

(65) Prior Publication Data
US 2021/0339424 A1 Nov. 4, 2021

(30) Foreign Application Priority Data
Sep. 10, 2018 (FI) .................................. 20185753

(51) Int. Cl.
*B27K 3/08* (2006.01)
*B27K 3/02* (2006.01)
*B27K 3/16* (2006.01)
*C09K 21/12* (2006.01)

(52) U.S. Cl.
CPC .............. *B27K 3/08* (2013.01); *B27K 3/0292* (2013.01); *B27K 3/166* (2013.01); *C09K 21/12* (2013.01); *B27K 2240/30* (2013.01)

(58) Field of Classification Search
CPC ........ B27K 3/08; B27K 3/0292; B27K 3/166; B27K 3/52; B27K 3/0278; B27K 3/0285; B27K 3/50; B27K 3/36; B27K 5/04
See application file for complete search history.

(56) References Cited

U.S. PATENT DOCUMENTS

| | | | | |
|---|---|---|---|---|
| 3,840,388 A * | 10/1974 | Perlus | .................... | B27K 5/001 427/377 |
| 6,042,639 A | 3/2000 | Valsoe et al. | | |
| 8,361,210 B2 * | 1/2013 | Ahlnas | .................. | A01N 37/02 106/18.32 |
| 8,425,980 B2 * | 4/2013 | Maynard | ................. | A01N 3/00 427/427.2 |
| 8,974,910 B2 * | 3/2015 | Nicholson | ............. | C09J 131/04 427/393 |
| 9,125,404 B2 | 9/2015 | Vuori et al. | | |
| 9,132,569 B2 | 9/2015 | Saari | | |
| 11,548,184 B2 * | 1/2023 | Kukkonen | ............. | B27K 3/166 |
| 2003/0104135 A1 | 6/2003 | Grantham et al. | | |
| 2011/0088590 A1 | 4/2011 | Ahlnäs et al. | | |
| 2014/0093742 A1 * | 4/2014 | Saari | ........................ | B27K 3/08 252/607 |
| 2018/0071944 A1 * | 3/2018 | Curran | ...................... | F26B 3/04 |

FOREIGN PATENT DOCUMENTS

| | | |
|---|---|---|
| FI | 121917 B | 6/2011 |
| FI | 122723 B | 6/2012 |
| JP | 2012091409 A | 5/2012 |
| KR | 20130024864 A | 3/2013 |
| WO | WO9100327 A1 | 1/1991 |
| WO | WO9116402 A1 | 10/1991 |
| WO | WO2011042609 A1 | 4/2011 |
| WO | WO2018162804 A1 | 9/2018 |

OTHER PUBLICATIONS

Comstock et al: Factors affecting permeability and pit aspiration in coniferous sapwood. Wood Science and Technology, Dec. 1968. vol. 2, Issue 4, pp. 279-291.
EN 717-1 Wood based panels—Determination of formaldehyde release—Parts 1: Formaldehyde emissions by chamber method Oct. 2004.
Lehringer: Permeability improvement of Norway spruce wood with the white rot fungus Physisporinus vitreus. Dissertation, Jan. 28, 2011. Retrieved from the Internet: https://ediss.uni-goettingen.de/bitstream/handle/11858/00-1735-000-0006-B144-8/lehringer.pdf?sequence=1. Annex: Paper I, "Introduction"; "Materials and Methods".
Wang et al: Fire performance of plywood. Bioresources, 2014, vol. 9, No. 3, pp. 4934-4945.
Östman et al: Innovative eco-efficient high fire performance wood products for demanding applications. Final report for Vinnova-Tekes project InnoFireWood. SP Wood Technology SP Report, 2006:30, Stockholm 2006.
International Standard: ISO 16000-6 Indoor air—Part 6: Determination of volotile organic compounds in indoor and test chamber air by active sampling on Texax-TA sorbent, thermal desorption and gas chromatography using MS or MS-FID. First edition, Mar. 15, 2004.

(Continued)

*Primary Examiner* — Michael P Wieczorek
(74) *Attorney, Agent, or Firm* — Laine IP Oy

(57) ABSTRACT

Method of treating wood products to improve fire resistance thereof. The method comprises treating wet wood objects with compositions comprising an aqueous solution of bisphosphonate selected from 1-hydroxyethane 1,1-diphosphonic acid, an alkanol amine, and optionally an alkaline agent, the composition having a pH in the range of 4.0 to 7.0 to impregnate the object with the compositions, and subjecting the object so obtained to drying to achieve aspiration of the pits of the wood object. The method can be used for protecting wood not only against fire but also against mould, rot, blue stain, insect such as termite attacks on wood, dimensional changes, or a combination thereof due to environmental influence.

24 Claims, No Drawings

(56) References Cited

OTHER PUBLICATIONS

International Standard: ISO 16000-9 Indoor air—Part 9: Determination of the emissions of volotile organic compounds from building products and furnishing—Emission test chamber method. First edition, Feb. 1, 2006.

International Standard: ISO 5660-1 Reaction-to-fire tests—Heat release, smoke production and mass loss rate—Part 1: Heat release rate (cone calorimeter method) and smoke production rate (dynamic measurement). Third edition Mar. 15, 2015, Corrected version Jan. 2021.

Occupational Safety and Health Administration (OSHA): Ammonia Backup Data Report (ID-188). United States Department of Labor, Revised Jun. 1990.

The Building Information Foundation RTS SR: M1 Emission Classification of Building Materials: Protocol for Chemical and Sensory Testing of Building Materials. Nov. 15, 2017.

VTT Expert Services OY: The effect of a fire retardant on the corrosion resistance of fastners. Research report No. VTT-S-00090-17, Jan. 5, 2017.

Zschimmer & Schwarz: Safety Data Sheet for Cublen K 60-US. Version 3.0, Issued May 1, 2015, Revised May 13, 2020.

* cited by examiner

METHOD OF TREATING WOOD MATERIALS

TECHNICAL FIELD

The present invention relates to fire protection of wood materials. In particular, the present invention concerns a method of treating wood materials as well as compositions for use in such a method.

BACKGROUND ART

Wood is the most abundant non-toxic, recyclable and biodegradable natural material, valued as a construction material because of its appearance and its high strength at low density. Recent architectural trends include the design and construction of increasingly tall buildings with structural components comprised of engineered wood referred to by names including; cross laminated timber (CLT), laminated veneer lumber (LVL), glued laminated timber (Glulam), plywood, or solid timber used as outdoor panel material.

Construction is currently underway on a 10-story apartment building in Melbourne, Australia, with taller structures up to 30 stories under design in Norway, Austria, Vancouver and in Finland. These buildings are cited for their advantages in sustainability resulting from the use of wood as a renewable construction material.

On the other hand lack of proper resistance against fire is an important drawback in using wood for constructions. Therefore, in building codes all over the world, including EU and countries such as USA, Japan and Australia, it is required that only wood that has been treated with proper fire retardants be used in walls, floors and roof assemblies. By properly protecting wood, the spread of smoke and fire can be contained and the time available for evacuation of the buildings and helping persons to move to safety be extended.

Many fire retardant compositions, for example of the kind described in U.S. Pat. No. 9,132,569 B2 and patent documents referred to therein, are based on pressure impregnation of the fire retardant into the wood. Alternatively, the chemical compositions described contain inorganic phosphate salts, for example as ammonium salts of phosphoric acid, such as APP, MAP and DAP, or boron contains agents, such as borates, or boric acid that are not environmentally acceptable or they are not enough powerful to fulfil B-s1,d0 fire class at low retention levels.

Moreover wood items treated with fire retardants of the APP, MAP and DAP type, are prone to physical and chemical deterioration if the treated items absorb moisture.

Some very latest patents and one literature review describe the use of organic phosphote salts, such as ammonium salt of HEDP acid as a promising fire retardant chemical instead of inorganic phosphates or boron compounds.

HEDP is an abbreviation for a bisphosphonate compound, 1-hydroxyethane 1,1-diphosphonic acid, also known by the name etidronic acid. HEDP is a chelating agent which has antioxidant properties.

Aqueous fire retardant compositions, such as compositions comprising HEDP, are applied on the wood materials in various ways.

The most cost effective fire retardant treatment is simply to spread the fire retardant solution using normal surface treatment equipment such as spraying equipment or rollers over to wooden item and let it dry on stock without separate drying treatment. MAP, DAP and borate and boric acid based fire retardant easily form precipitates on the treated wooden items. If solid precipitates form over the wooden item such as plywood, the treated plywood panels cannot be separated from each other after the drying. The precipitates works as a glue between the panels. If panels are dried separately that will increase remarkably the cost of the treatment.

Wood can also be treated by pressure impregnation.

The main problems with the pressure impregnation using conventional inorganic fire retardants, such as ammonium phosphate (APP), MAP, DAP, borate or boric acid, are the high costs due to investment for the pressure impregnation equipment, the high amount of fire retardant required for B fire class, and the smoke generation.

If pressure impregnation is outsourced from the wood manufacturer the logistics cause cost and delays due to the fire retarding treatment and thus increase the price of the fire retardant treated wooden item. Moreover, high amount of fire retardant increases the generation of toxic smoke [Wang et al. (2014). Fire performance of plywood," BioResources 9(3), 4934-4945] which is undesired and does not fulfil fire class requirement such B-s1, d0 required at indoor applications.

Pressure impregnation also weakens the mechanical and physical properties of the wood, especially of the engineered wood products, such as CLT, LVL and plywood, that are so-called glued wood products.

Inorganic MAP, DAP, borate and boric acid fire retardants fulfil B class only if they are used in the pressure impregnation process because these fire retardants are not enough effective for the surface treatment processes such as brushing or spraying. In the surface treatment process less chemical can be applied into wooden item compared to pressure impregnation process.

SUMMARY OF THE INVENTION

It is an aim of the present invention to eliminate at least a part of the problems relating to the art.

It is another aim of the present invention to provide a novel method of applying fire retardants, such as bisphosphonate and bisphosphonic acids in combinations with other components to wood objects.

The present invention is based on the finding that the fire-resistance of lumber and other wood objects can be significantly improved by treating the wood objects in wet condition with an aqueous composition containing a fire retardant composition and by drying the wood after the treatment.

Wood, in particular conifers, such as those belonging to the Pinaceae family, possess a bordered pit structure with pit membrane with a centralized thickened disk, the torus, and a supporting membrane, or margo, which consist of strands of cellulose microfibrils. Spruce wood is known to have low permeability which is related mainly to the aspiration of bordered pits during wood drying. In the living tree, permeability is mainly determined by the bordered and half bordered pits that constitute the interconnecting voids between the tracheids and the xylem ray parenchyma.

During wood drying, most of these pits get irreversibly closed due to the aspiration of the flexible pit membranes. Aspiration is considered to be irreversible because of the formation of hydrogen bonds between the torus/margo and the pit opening.

Thus, by impregnating green or non-dried wood objects, such as lumber, with aqueous fire retardant compositions and by drying the wood object after treatment to close at least a part of the bordered pits, much of the fire retardant will be retained in wood after drying. As a result a significant improvement of fire resistance can be achieved.

Particularly good results can be achieved using fire retardant compositions containing bisphosphonate as fire retarding agents or components thereof. Such aqueous compositions preferably contain HEDP or another bisphosphonate or bisphosphonic acid in combination with alkaline agent and alkanol amines, in particular alkanol amines. The present compositions can be produced by mixing, and optionally reacting, the components together.

The compositions can be used in a method for treating wood and wood-based products as described herein for thus producing novel wood and wood-based products, which contain HEDP or another bisphosphonate or bisphosphonic acid, alkanol amine and, optionally, a further alkaline agent or further alkaline agents and which exhibit enhanced long-term fire resistance.

More specifically, the present invention is characterized by what is stated in the characterizing parts of the independent claims.

Considerable advantages are obtained by the invention.

By applying, for example by immersing, wet wood objects into an aqueous fire retardant composition for example of the present kind containing HEDP, and by drying the wood object such as to at least partially close the pits, long-term protection is reached.

It would appear that the water-borne fire retardant will penetrate into the wood material and become adhered to the material so that leaching out of the fire retardant will be significantly reduced. In fact, tests carried out on wet wood in combination with the present aqueous fire retardants show that after drying of the wood object, practically no fire retardant will be leached out upon renewed immersion of the wood object into water or when the wood object is exposed to rain over extended periods of time.

Moreover, and quite surprisingly it has been found that the novel compositions disclosed herein have excellent properties of wood penetration—they absorb well into the treated wooden items and have excellent retention. It is possible that the fire retardants discussed below have good affinity to wood and that they are therefore retained both due to that affinity but also due to the closing of the aspiration of the flexible pit membranes. This is merely one option and the invention is not to be construed as limited to this explanation.

The invention also makes possible to prevent formation of structural defects such as cracking during drying of green wooden material. The compositions according to the invention form a hygroscopic chemical layer on the surface of the wooden material and in a such way stabilize the drying process i.e. reduce the heat and mass transport of the surface of wooden material.

Further, the aqueous compositions used in the method exhibit many interesting features as such. The treated wood is endowed with excellent resistance fire without smoke generation or ammonia release during the manufacture of the compositions.

The fire retardant treated wooden item according to the invention fulfils the most demanding B-s1,d0 fire class e.g. in EU area.

The compositions used are practically free from ammonial smell at the pH values for which good stability and extended shelf-life can be achieved. This advantages is achieved both during manufacture and storage. Thus, the compositions typically exhibit an ammonia release rate less than 0.03 $mg/m^2h$ described in M1 classification and Protocol for Chemical and Sensory Testing of Building Material, Version 22.1.2015.

The compositions preferably used in the present invention are also stable at pH values in the neutral pH range or slightly acidic range, in particular the products are stable at pH less than 7.0, for example at pH of 4.0 up to 6.2, most preferably at pH of 5.0 up to 6.2 or 5.2 to 6.0. The compositions have an extended shelf life of over more than 6 months. Thus, at least for more than 6 months, the compositions will remain useable for the indicated purpose.

Typically, the compositions will have a pH which lies within the pH range of less than 7.0, for example at pH of 4.0 up to 6.2, most preferably at pH of 5.0 up to 6.2 or 5.2 to 6.0, for more than 6 months.

Further, it has been found that when the present compositions are used for treating plywood, there is no or practically no loss of strength properties in the plywood.

The present compositions can, without loss of stability and with excellent shelf-life, be prepared to a high concentration of active substance which gives the benefit that an improvement of fire resistance can be achieved even at low application amounts which, in turn, makes it possible to use convention gluing or application technologies for application. There is no mandatory need for resorting to pressure impregnation, although that technology is also possible when using diluted solutions.

Further features and advantages will be clear from the following detailed description of embodiments.

DETAILED DESCRIPTION OF EMBODIMENTS

In the present context, the term "wet wood" denotes wood having a moisture content greater than 40% by weight, in particular greater than 50% by weight.

In the present context, the term "green wood" designates wood that has been recently cut.

Typically it has not had an opportunity to dry (or "season") by evaporation of internal moisture.

The timber of living trees and fresh logs, i.e "green woods", contains a large amount of water.

Such water is present in three forms:

1) Free water: The bulk of water contained in the cell lumina is only held by capillary forces. It is not bound chemically and is called free water. Free water is not in the same thermodynamic state as liquid water: energy is required to overcome the capillary forces. Furthermore, free water may contain chemicals, altering the drying characteristics of wood.

2) Bound or hygroscopic water: Bound water is bound to the wood via hydrogen bonds. The attraction of wood for water arises from the presence of free hydroxyl (OH) groups in the cellulose, hemicelluloses and lignin molecules in the cell wall. The hydroxyl groups are negatively charged. Because water is a polar liquid, the free hydroxyl groups in cellulose attract and hold water by hydrogen bonding.

3) Vapour: Water in cell lumina in the form of water vapor is normally negligible at normal temperature and humidity.

Since a living tree contains very large amounts of water, lumbermen often refer at various stages from the initial cutting of a tree up through the sawing and drying of lumber to the moisture content (MC) of the wood. The moisture content of the wood, usually expressed in a percentage, is a ratio of the amount of water in a piece of wood that is compared to the weight of such wood when all of the moisture has been removed. One of the methods that is employed (the moisture content on the over-dry basis) to determine the MC of wood at any stage during the lumber production process is to weigh a given sample of wood and record such weight (the wet weight). The sample is then placed into an oven and heated at temperatures not to exceed 105° C. until all of the moisture has been removed (the oven dry weight) and that weight is recorded. It can be determined that the oven-dry weight has been reached when, after weighing at various intervals, the sample stops losing weight. The oven-dry weight is then subtracted from the wet weight and the resultant is then divided by the oven-dry weight.

When a tree such as spruce or any one of the many species of trees that yield wood that is useful in the production of wood products is initially cut down, it has a MC of anywhere from about 50% to 100%. This moisture content has been found to be even higher, as much as about 200% for some species.

When green wood dries, free water from the cell lumina, held by the capillary forces only, is the first to go. Physical properties, such as strength and shrinkage, are generally not affected by the removal of free water. The fibre saturation point (FSP) is defined as the moisture content at which free water should be completely gone, while the cell walls are saturated with bound water. In most types of woods, the fibre saturation point is at 25 to 30% moisture content (MC).

Wood is a hygroscopic substance. It has the ability to take in or give off moisture in the form of vapour. Water contained in wood exerts vapour pressure of its own, which is determined by the maximum size of the capillaries filled with water at any time. If water vapour pressure in the ambient space is lower than vapour pressure within wood, desorption takes place. The largest-sized capillaries, which are full of water at the time, empty first. Vapour pressure within the wood falls as water is successively contained in smaller capillaries. A stage is eventually reached when vapour pressure within the wood equals vapour pressure in the ambient space above the wood, and further desorption ceases. The amount of moisture that remains in the wood at this stage is in equilibrium with water vapour pressure in the ambient space, and is termed the equilibrium moisture content or EMC. Because of its hygroscopicity, wood tends to reach a moisture content that is in equilibrium with the relative humidity and temperature of the surrounding air. The EMC of wood varies with the ambient relative humidity (a function of temperature) significantly, to a lesser degree with the temperature. Wood retains its hygroscopic characteristics after it is put into use. It is then subjected to fluctuating humidity, the dominant factor in determining its EMC. These fluctuations may be more or less cyclical, such as diurnal changes or annual seasonal changes.

The permeability of wood is a measure of the ease with which fluids flow through it. Longitudinal permeability of coniferous woods is controlled almost exclusively by the bordered pits. In green sapwood these pits are quite permeable and permit easy passage of fluids and small suspended particles.

Most important conifers, in particular those belonging to the Pinaceae family, possess a bordered pit structure with pit membrane with a centralized thickened disk, the torus, and a supporting membrane, or margo, consisting of strands of cellulose microfibrils. Spruce wood is known to have a low permeability which is related mainly to the aspiration of bordered pits during wood drying. In the living tree, permeability is mainly determined by the bordered and half bordered pits that constitute the interconnecting voids between the tracheids and the xylem ray parenchyma.

Based on the above, to achieve proper diffusion of the fire retardants into the wood cell wall in the present technology wet wood, such as green wood, for example of spruce, is contacted with a composition according to any of the above embodiments.

In particular, it is preferred that the wood which is contacted with the compositions has not earlier been subjected to drying. This is also referred to as "never-dried" or "non-dried" wood.

In the wet wood, the percentage of bordered (closed) pits is typically less than 10% of the pits, for example about 1 to 8 vol-% of the pits.

In one embodiment, green wood is contacted with a composition according to any of the above embodiments.

In one embodiment, wood typically having a water content of at least 50% of the wood's weight, is subjected to treatment, preferably using an aqueous fire retardant composition of the present kind. The wood object is thoroughly soaked with the aqueous composition to impregnate the wood with the fire retarding agent.

The term "impregnation" refers to the contacting of the wood object with the aqueous fire retardant composition at conditions which allow for the penetration of the aqueous composition into the wood.

In one embodiment, the wood object is impregnated with the aqueous composition to achieve a weight increase of the wood object of at least 10% by weight, in particular 15 to 100% by weight, typically about 20 to 60% by weight.

After treatment, the wood object is subjected to drying. The wood object is typically dried to a moisture content of less than 40%, in particular less than 30%, for example less than 20% and in particular 12% or less by weight of the wood material.

One object of the drying is to achieve aspiration of the pits of the wood object. By aspiration of the pits, a marked reduction in permeability is aimed at. In one embodiment, the percentage of the bordered (closed) pits is at least 30%, in particular at least 40%, for example 45 to 99% or 50 to 70%.

Thus, according to an embodiment, after the impregnation of the wet wood object with the present aqueous fire retardant, drying is carried out to such that most of these pits get irreversibly closed due to the aspiration of the flexible pit membranes. Aspiration can be considered to be irreversible because of the formation of hydrogen bonds between the torus/margo and the pit opening.

In one embodiment of the surface impregnation (i.e. immersion) is carried out under vacuum conditions (i.e. a pressure below 1 bar, for example at about 0.001 to 0.95 bar, in particular about 0.01 to 0.8 bar).

In one embodiment a vacuum box or vacuum roller is used in the surface impregnation process. A vacuum is applied to incorporate the chemicals into the bulk of the green wood material. If the chemicals are required to diffuse into the cell wall then it is important that the cell wall is not filled with air. Therefore, green wooden material can be used or a vacuum can be first applied using the vacuum system to remove air from the cell wall and then the solutions of the invention can then be applied with or without further vacuum.

Improving the penetration, like increasing the absorption of the solutions of the invention or accelerating the treatment rate, to the bulk of the green wood, is possible by methods like heating, incising, microwaving, plasma treatment, compression, steaming, micro-organisms, enzyme treatment, chemical treatment, or in case of plywood like increasing the peeling checks during peeling of the veneers.

1) Pressure Impregnation

A conventional method for entering great amounts of impregnation substance in wood, and thereby providing the most effective treatment by means of different steps (negative pressure and overpressure, elevated temperature). By this method, the best penetrability of compositions is obtained, and the wood can normally be impregnated to the core. The composition according to the invention has a very good penetrability, wherein it is possible to reduce the negative pressures/overpressures used in conventional CCA impregnation and thereby to improve the cost-effectiveness of the process. Also, a tighter-grained type of wood, such as spruce, can be pressure impregnated with the composition according to the invention, which has not been possible with conventionally used substances.

2) Immersion Impregnation

The penetrability of the composition according to the invention is good, and in some cases, mere immersion impregnation is also possible. This method is simple but it requires separate immersion basins and is carried out in batch processes, like the pressure impregnation.

3) Spraying or Rolling

The composition according to the invention can be sprayed or rolled onto the surface of wood, for example, in connection with the planning of sawn timber.

4) Painting or Other Surface Treatment Line

The composition according to the invention may also be added into the wood in connection with a painting or another surface treatment line. From a paint dosing tank, a wooden board can be impregnated with the solution under overpressure or negative pressure through a separate painting unit. Depending on the pressure and the speed of the line, good penetrability and thereby a good to fire can be achieved by this method.

After impregnation, the treated object is subjected to drying. Drying can be carried out by methods known in the art, for example by air-drying. Thus, drying can be carried out generally at temperature of at least 10° C., for example at least 15° C., suitably at least 20° C.

In one embodiment, drying is carried out as thermal drying employing a temperature higher than the ambient, for example using a hot oven or kiln having an inner temperature of more than 40° C., in particular more than 60° C., such as more than 100° C., in particular at about 105° C. or more. However, preferably under less than 160° C., in particular less than 150° C., typically less than 140° C., for example less than 125° C.

Typically, drying is carried out at ambient pressure (1 bar).

In one embodiment, drying is carried out in an autoclave in which conditions of increased or reduced pressure are employed. Thus, in a first embodiment, the absolute pressure is 0.5 to 0.95 bar. In a second embodiment, the absolute pressure is 1.1 to 2.5 bar.

Drying can be carried out employing a rising and sloping temperature gradient so as to maintain a temperature difference between the interior temperature of the wood object and the surface temperature of the wood object of less than 30° C., in particular less than 20° C., typically about 5 to 15° C. By such an embodiment, the formation of cracks within the wood object can be avoided.

Other means for achieve drying of the wood objects include the use of circulating hot air, and radiation, such as IR radiation. These can be combined with any of the above mentioned embodiments.

The aim of the drying is to achieve an at least partial aspiration of the pits of the wood object.

Thus, in one embodiment, the percentage of the bordered (closed) pits in a wood object dried as referred to above is more than 40%, in particular about 50 to 60%. By contrast, in green wood, the aspired pits make up typically less than 10% of the pits.

As briefly discussed above, the present compositions comprise an aqueous solution comprising bisphosphonic acid, bisphosphonate and other organic phosphonates.

One example of such bisphosphonic acids is HEDP (1-hydroxyethane 1,1-diphosphonic acid) used as fire retardant for pine sapwood and thermally modified spruce. The liquid concentration in the fire tests is stated as being 20, 40 and 60 wt-% before neutralization with ammonia [Birgit Östman et al. "Innovative eco-efficient high fire performance wood products for demanding applications" (Final report for Vinnova-Tekes project InnoFireWood. SP Wood Technology SP REPORT 2006:30)].

Bisphosphonic acid compositions are also described in U.S. Pat. No. 8,361,210 B2 (Ahlnas & Kukkonen), U.S. Pat. No. 9,125,404 B2 (Vuori & Nissinen), FI 121917 B (Mertaniemi et al.) and FI 122723 B (Kukkonen, Nissinen & Aksela), the contents of which are herewith incorporated by reference.

Particularly interesting compositions are disclosed in FI20175221, the contents of which are also incorporated by reference.

Thus, the present compositions comprises in particular an aqueous solution of a selected from 1-hydroxyethane 1,1-diphosphonic acid, and an alkanol amine, and optionally an alkaline agent. The composition typically has a pH in the range of 3.0 to 9.0, preferably in the range of 4.0 to 7.0.

In one embodiment, HEDP forms a salt (an acid salt) with the alkanol amine and/or alkaline agents. The acid salt is a salt formed from an acid (i.e. HEDP) with bases (i.e. alkanol amine and/or alkaline agents) by only partial replacement of hydrogen ions from the related acid i.e. HEDP, leaving some degree of acidity.

Thus, in one embodiment, a fire retardant composition with HEDP, alkaline agent and alkanol amine, which is added into the solution primarily in free form to give a pH of 4 to 7, appears to contain HEDP primarily or at least partially in the protonated form. But this is merely a suggestion and the scope of the present technology is not limited to the explanation.

In another embodiment, the alkaline agent is added in the form of a salt of HEDP. Thus, a salt of HEDP, formed from HEDP in acid form and at least one alkaline agent, is mixed with alkanol amine in the presence of water to provide an aqueous composition comprising a mixture or reaction product of bisphosphonic acid, alkaline agent(s) and alkanol amine(s) and having a pH in the range of 3.0 to 9.0, preferably in the range of 4.0 to 7.0.

According to one embodiment, by reacting first the alkaline agent and HEDP together, the alkaline agent reacts more efficiently without staying as a free component into the final solution. Through this neutralization reaction pH of the solution is increased, which after alkanol amine can be added to adjust the pH to appropriate level and to form amine-HEDP complex. Alkaline agent in the form of a salt of HEDP can be brought to the process as such or produced as a part of the process.

A composition achieved according to the present technology is capable of achieving good fire retarding properties for wood products treated therewith. By contrast, the organic acid salts of ammonia, such as ammonium carboxylate, in the above cited art have been found to increase the smoke generation rate and to increase ammonia release (ammonia smell) even at pH values close to 6 and moreover they loose chemical stability when pH is lowered below 6.

According to a preferred embodiment, the composition contains no carboxylic acids in free form or bound to the amine or alkaline component.

According to another embodiment, the composition is essentially free of carboxylic acids, i.e. comprises not more than 1%, preferably not more than 0.5%, by weight of carboxylic acids. In the present context, the term "bisphosphonic acid" will be used for referring to the 1-hydroxyethane 1,1-diphosphonic acid component i.e. HEDP, and "bisphosphonate" will be used to refer to its anion(s). Obviously, depending on the pH of the composition, HEDP, even when added as a salt, will be partially or totally present in dissociated form (i.e. in protonated form).

The salt can be inorganic or organic, preferably inorganic. In particular the salt is formed from ammonia, although alkali metal and earth alkaline metal salts are also possible.

In the present context, the term "bisphosphonate component" covers both the bisphosphonic acid and the bisphosphonate anion(s) or "species".

Similarly, as used herein, the abbreviation "HEDP" and the name "1-hydroxyethane 1,1-diphosphonic acid" cover both the bisphosphonic acid as such and the corresponding bisphosphonate anion(s).

"pHT" of the composition is measured directly from the solution, in particular aqueous solution.

Examples of other bisphosphonates and bisphosphonic acids, respectively, that can be used in the present technology, include the following: clodronate, tiludronate, pamidronate, neridronate, olpadronate, alendronate, ibandronate, risedronate or zoledronate or organic phosphonates such as aminomethylphosphonic acid (AMPA), vinylphosphonic acid, dimethyl methylphosphonate (DMMP), aminotrismethylenephosphonic acid (ATMP), ethylenediaminetetramethylenephosphonic acid (EDTMP), tetramethylenediaminetetramethylenephosphonic acid (TDTMP), hexamethylenediaminetetramethylenephosphonic acid HDTMP) diethylenetriaminepentamethylenephosphonic acid (DTPMP), phosphonobutanetricarboxylic acid (PBTC), N-phosphonomethyliminodiacetic acid (PMIDA), 2-carboxyethyl phosphonic acid (CEPA), 2-Hydroxyphosphonocarboxylic acid (HPAA), aminotrismethylenephosphonic acid (AMP), N,N-Bisphosphonomethylglycine (BPMG).

Although the present invention primarily concerns compositions and methods utilizing HEDP as bisphosphonic acid, it should be understood that HEDP can also be replaced, partially or totally, by another bisphosphonic acid or mixture of bisphosphonic acids, such as those mentioned below, or even by any other acid functioning in the same way as HEDP in combination with other components of the composition.

Thus, in one embodiment, the present technology provide a fire retardant composition for treatment of wood products, comprising an aqueous solution of a mixture or a reaction products of bisphosphonic acid selected from 1-hydroxyethane 1,1-diphosphonic acid, clodronate, tiludronate, pamidronate, neridronate, olpadronate, alendronate, ibandronate, risedronate or zoledronate or organic phosphonates such as aminomethylphosphonic acid (AMPA), vinylphosphonic acid, dimethyl methylphosphonate (DMMP), aminotrismethylenephosphonic acid (ATMP), ethylenediaminetetramethylenephosphonic acid (EDTMP), tetramethylenediaminetetramethylenephosphonic acid (TDTMP), hexamethylenediaminetetramethylenephosphonic acid (HDTMP) diethylenetriaminepentamethylenephosphonic acid (DTPMP), phosphonobutanetricarboxylic acid (PBTC), N-phosphonomethyliminodiacetic acid (PMIDA), 2-carboxyethyl phosphonic acid (CEPA), 2-Hydroxyphosphonocarboxylic acid (HPAA), aminotrismethylenephosphonic acid (AMP), N,N-Bisphosphonomethylglycine (BPMG) and combinations thereof, and an alkanol amine, and optionally an alkaline agent, and said composition having a pH in the range of 3.0 to 9.0, in particular 4.0 to 7.0.

In the present context, the term "alkanol amine" includes "alkyl alkanolamines" as will be discussed below.

The 1-hydroxyethane 1,1-diphosphonic acid in the aqueous solution is primarily present in acid form, and preferably at least 50 mole-% of the bisphosphonate is present as an acid.

In one embodiment, the present composition contains
0.1 to 50%, preferably 1.0 to 40% by weight, for example 20 to 40% by weight of 1-hydroxyethane 1,1-diphosphonic acid, or a mixture of 1-hydroxyethane 1,1-diphosphonic acid and other bisphosphonic acids or bisphosphonates and/or other organic phosphonates and/or other bisphosphonic acids or bisphosphonates, calculated from the amount of the dissolved components of the composition,
1 to 30% by weight of an alkanol amine or a mixture of alkanol amines calculated from the amount of the dissolved components of the composition, and
optionally 1 to 30% by weight of an alkaline agent calculated from the amount of the dissolved components of the composition Alternatively, when the alkaline agent is ammonia, it can be introduced at least partially by adding the bisphosphonic acid in the form of its salt (as a "bisphosphonate"), as mentioned above. Thus in one embodiment, the present composition contains
0.1 to 70%, preferably 1.0 to 60% by weight, for example 20 to 50% by weight of 1-hydroxyethane 1,1-diphosphonic acid, or a mixture of 1-hydroxyethane 1,1-diphosphonic acid and other bisphosphonic acids or bisphosphonates and/or other organic phosphonates, calculated from the amount of the dissolved components of the composition, in the form of the salt of an alkaline agent, such as ammonia; and
1 to 30% by weight of an alkanol amine or a mixture of alkanol amines calculated from the amount of the dissolved components of the composition.

Addition of ammonia as an alkaline agent in the form of a salt of bisphosphonic acid decreases the amount of free ammonia, and thus ammonia smell, in the final solution and prevents the coloring of the solution.

In one preferred embodiment, the alkanol amine is selected from amines having the formula $$NR^1R^2R^3 \qquad \qquad I$$

wherein
$R^1$, $R^2$ and $R^3$ are independently selected from hydrogen and alkyl having 1 to 6 carbon atoms and optionally substituted with at least one substituent selected from hydroxyl groups, mono-, di- and tri-alkanol amines, such as mono-, di- and tri-$C_{1-6}$-alkanol amine.

For example, the alkanol amine can be selected from the group of monoethanolamine, monoisopropanolamine, mono-sec-butanolamine, diethanolamine, di-isopropanolamine, di-sec-butanolamine, triethanolamine and tri-isopropanolamine and mixtures thereof.

In another embodiment, the alkanol amine is selected from the group of alkyl alkanolamines, such as $C_{1-6}$-alkyl-$C_{1-6}$-alkanolamines, in particular from the group of methyl ethanolamine, butylethanolamine, dimethylethanolamine, diethylethanolamine, methyldiethanolamine and ethyldiethanolamine and mixtures thereof.

The alkanol amine can also comprise a mixture of alkanolamines and alkyl alkanolamines.

Although the typically basic alkanolamine will adjust the pH of the composition, in addition to the bisphosphonate component and the alkanol amine, the composition typically also contains a separate or second alkaline agent.

In one embodiment, the alkaline agent is selected from group of inorganic hydroxides and carbonates, such as alkali metal and earth alkaline metal hydroxides and carbonates, ammonia, ammonium hydroxide and mixtures thereof, the alkaline agent preferably being an aqueous solution of ammonia.

In one embodiment, the alkaline agent is selected from aqueous solutions of ammonia containing 1 to 25%, for example 10 to 25%, by weight of ammonia dissolved in water. In particular, aqueous solutions which are saturated in respect of ammonia are used. In one embodiment, an aqueous solution of ammonia having a pH of at least about 8.5, for example 9 to 13, is employed.

In case an inorganic hydroxide or carbonate is used, it is preferred to use a calcium-free component, since calcium ions may form an insoluble complex with the bisphosphonate.

The alkaline agent is generally present in an amount sufficient to adjust the pH of the aqueous solution of the 1-hydroxyethane 1,1-diphosphonic acid and the alkanol amine to a value in the range of 3.0 to 9.0, for example 4.5 to 8.0, in particular 4.0 to 7.0, most preferably in the range of 5.0 to 6.0.

In one embodiment, the alkaline agent is present in an amount of 0.1 to 40% by weight of the solution, in particular 1 to 30% by weight of the solution.

In one embodiment, the composition has a pH in the range of 4.0 to 7.0, most preferably in the range of 5.0 to 6.5, for example 5.2 to 6.0.

Based on the above in one particularly preferred embodiment, the alkaline agent comprises aqueous ammonia water, the bisphosphonate component comprises 1-hydroxyethane 1,1-diphosphonic acid and the alkanol amine comprises monoethanolamine or triethanolamine or a mixture thereof.

As discussed above, in one embodiment 20 to 90 wt-%, for example 30 to 80 wt-% of the bisphosphonate component is added in the form of an ammonium salt, which is mixed with an alkanol amine and optionally water to provide an aqueous solution having a pH in the above-mentioned range of 4.0 to 7.0, in particular about 5.0 to 6.5, for example 5.2 to 6.2.

In one embodiment, a composition according to any one of the above embodiment has good stability, and typically the shelf-life is extended with at least up to 6 months, preferably more.

The compositions can be formulated for various application methods. In one embodiment, the water content of the aqueous composition is adjusted to a value of 35% by weight or more, typically up to 95% by weight. This will give a composition which is easy to apply by simple spraying or other surface treatment technique such as rolling. In another embodiment, the water content of the aqueous composition is adjusted to a value of less than 40%, in particular 35% or less, for example 10 to 35% by weight.

There can be further components incorporated into the composition such as retention agents and/or hydrophobizing agents which may be added to the composition of the invention. Suitable retention agents may be fatty acids, polymers such as starch, cellulose or derivatives thereof, chitosan and silicon compounds. Hydrophobizing agents include resins and derivatives thereof, surface sizes such as alkyl ketene dimer (AKD) or alkenylsuccinic acid (ASA), and tall oil and the derivatives thereof. AKD, ASA and/or tall oil and derivates thereof are preferably used as hydrophobizing agents, the preferable amount thereof being 0.01 to 5.0% by weight.

In another embodiment, the compositions contain surfactants that lower the surface tension of a liquid, allowing easier spreading, and lower the interfacial tension in between two liquids. A surfactant can be classified by the presence of formally charged groups in its head. A non-ionic surfactant has no charge groups in its head. The head of an ionic surfactant carries a net charge. If the charge is negative, the surfactant is more specifically called anionic; if the charge is positive, it is called cationic. If a surfactant contains a head with two oppositely charged groups, it is termed zwitterionic.

In one embodiment, the composition contains a further fire retardant, for example one selected from the group of ammonium phosphates, borate and boric acids and mixtures thereof or ferric phosphate.

In another embodiment, which can, for example, be combined with the previous one, the composition comprises a complexing agent, in particular the further complexing agent is selected from the group of ethylenediaminesuccinic acid, iminodisuccinic acid, N-bis-[2-(1,2-dicarboxyethoxy)-ethyl]-aspartatic acid, ethylenediaminetetraacetic acid and diethylenetriaminepentaacetic acid and mixtures thereof.

In still a further embodiment, the composition consists only of the three components discussed earlier, viz. an alkaline agent, 1-hydroxyethane 1,1-diphosphonic acid and an alkanol amine, which all are dissolved or at least dispersed in water.

One important advantage of embodiments is that they are free or practically free from ammoniacal fumes and smells. In one embodiment, the composition exhibits an ammonia release rate less than the 0.03 $mg/m^2h$ described in Ml classification and Protocol for Chemical and Sensory Testing of Building Material. Version 22.1.2015.

The present compositions can be produced by mixing together HEDP with an alkanol amine or a mixture of alkanol amines and optionally with an alkaline agent, such as ammonia in water.

In one embodiment, the method of producing a fire retardant composition comprises mixing together
    to 60, for example 30 to 50, parts by weight of HEDP;
    1 to 10 parts by weight of an alkanol amine or mixture thereof, said alkanol amine being added in free form;
    optionally 0.1 to 40 parts by weight of an alkaline agent, preferably an aqueous alkaline agent, such as an aqueous solution of ammonia or an alkaline metal or earth alkaline metal hydroxide or carbonate; and
    optionally water, to provide a composition having a pH in the range of 3 to 9, for example 4 to 7.

In another embodiment, the method of producing a fire retardant composition for treatment of wood products, comprising an aqueous solution of a mixture or a reaction products of a bisphosphonic acid and an alkanol amine, and optionally an alkaline agent, comprises mixing together
    to 60, for example 30 to 50, parts by weight of a bisphosphonic acid;
    1 to 10 parts by weight of an alkanol amine or mixture thereof, said alkanol amine being added in free form;
    optionally 0.1 to 40 part by weight of an alkaline agent; and water, to provide a composition having a pH in the range of 3.0 to 9.0.

Mixing of the components is carried out at a temperature of 10 up to 100° C., preferably less than 100° C., in particular at about 10 to 60° C.

Typically, the composition has a water content of up to 60% by weight of the total composition. The components added typically contain water, but additional water is added to obtain a predetermined solid matter content of, for example 50% by weight or more, calculated from the total composition.

In embodiments of the method, the combined amount of the base equivalents of the alkanol amine and alkaline agent amounts to at least of 50% of the acid equivalents of HEDP or other bisphosphonic acid. In other words, the amine and any alkaline agent are added in sufficient amount to adjust the pH of the solution to a value which is higher than the pKa values of the first and second acid groups of HEDP or other bisphosphonic acid.

In one embodiment, a particularly interesting composition is obtained by mixing together 35 to parts by weight of HEDP, provided in the form of an aqueous solution, 4 to 8 parts by weight of an alkanol amine selected from monoethanolamine, monoisopropanolamine, mono-sek-butanolamine, diethanolamine, di-isopropanolamine, di-sek-butanolamine, triethanolamine and triisopropanolamine and mixtures thereof, and 2 to 10 parts by weight of ammonia dissolved in water. Further, optionally 0.1 to 5 parts by weight of an ionic tenside is admixed, optionally provided in the form of an aqueous solution. Water is added, if necessary.

Embodiments also includes methods of treating wood products for conferring properties of fire retardancy to the wood products, comprising contacting the wood products with a composition according to any of the above-discussed embodiments.

By the surface treatment step, onto the wood product an amount of 10 to 500 g/m², for example 100 to 300 g/m², of the fire retardant composition is applied. In the pressure impregnation process an amount of 10 to 200 kg/m³, for example 25 to 100 kg/m³, of the fire retardant composition is applied.

The invention makes it possible to treat wood materials in a light and cost-efficient way, and the treatment can be easily included in other present-day steps of wood treatment. The process may be one step in a processing line of timber or wooden objects comprising successive steps. The composition according to the invention is also pleasant to handle, because it does not emit strongly irritating odours for example ammonia gas. In the following, practical examples will be given of methods how the treatment composition can be used for the treatment of wood and how the treatment can be integrated in a wood material processing line in mills for wood processing.

Prior to the treatment of wood, the treatment composition may be diluted with water to give the concentration suitable for the treatment.

With respect to the specific application methods, the water concentration can vary, as mentioned earlier. Thus, for pressure impregnation, compositions containing up to 95% of water by mass can typically be employed; preferably the water concentration is about 60 to 90% by mass. Similarly, for spraying or rolling, compositions containing a majority of water, by mass, are typically used, such as 55 to 90% by mass. For immersion the water content is typically less than 80% by mass, for example 10 to 70%, or 20 to 60% by mass.

Physical properties of the composition such as viscosity may be adjusted according to the type and purpose of the treatment.

It should be noted that in an embodiment, the retention and fire protection is improved by increasing the temperature of the solution and/or concentration of the fire retardant solution.

The impregnation of wood with a cell wall penetrating substance depends upon diffusion at a wood cellular level. The rate of diffusion depends upon the diffusion coefficient, temperature, and concentration of the chemicals. Maximum accessibility to the interior of the wood cell wall is achieved when the wood is in a swollen state, most readily achieved by water saturation of the material.

There are no permanent capillaries in the cell walls. When water is desorbed during drying, the microfibrils in the cell walls move closer together (shrinking). After re-wetting, the microfibrils move apart again (swelling), but not necessarily to the same positions as before, with water occupying all the spaces between microfibrils.

Before application, the composition can be mixed with a glue used for bonding together two or more wood plies in order to form a multiply structure.

The present technology is particular useful for treating wood objects sourced from coniferous wood species.

In one embodiment, the present technology is used for treating wood object obtained from wood of the genus *Picea*. This is a genus of about 35 species of coniferous evergreen trees in the family Pinaceae, found in the northern temperate and boreal (taiga) regions of the Earth.

Thus, the wood objects can be obtained from wood selected from the group of species formed by:

*Picea breweriana*—Brewer's spruce, Klamath Mountains, North America

*Picea sitchensis*—Sitka spruce, Pacific coast of North America

*Picea engelmannii*—Engelmann spruce

*Picea glauca*—white spruce, northern North America

*Picea brachytyla*—Sargent's spruce, southwest China

*Picea chihuahuana*—Chihuahua spruce, northwest Mexico (rare)

*Picea farreri*—Burmese spruce, northeast Burma, southwest China (mountains)

*Picea likiangensis*—Likiang spruce, southwest China

*Picea martinezii*—Martinez spruce, northeast Mexico

*Picea maximowiczii*—Maximowicz spruce, Japan (rare, mountains)

*Picea morrisonicola*—Taiwan spruce, Taiwan (high mountains)

*Picea neoveitchii*—Veitch's spruce, northwest China

*Picea orientalis*—Caucasian spruce or Oriental spruce, Caucasus, northeast Turkey

*Picea purpurea*—purple cone spruce, western China

*Picea schrenkiana*—Schrenk's spruce, mountains of central Asia

*Picea smithiana*—morinda spruce, western Himalaya, eastern Afghanistan, northern and northwest India

*Picea spinulosa*—Sikkim spruce, northeast India (Sikkim), eastern Himalaya

*Picea torano*—tiger-tail spruce, Japan

*Picea wilsonii*—Wilson's spruce, western China

*Picea abies*—Norway spruce, Europe;

*Picea alcoquiana*—("*P. bicolor*") Alcock's spruce, central Japan (mountains)

*Picea alpestris*—Norway spruce, Alpine spruce, the Alps in Europe

*Picea asperata*—dragon spruce, western China

*Picea crassifolia*—Qinghai spruce, China
*Picea glehnii*—Glehn's spruce, northern Japan, Sakhalin
*Picea jezoensis*—Jezo spruce, northeast Asia, Kamchatka south to Japan
*Picea koraiensis*—Korean spruce, Korea, northeast China
*Picea koyamae*—Koyama's spruce, Japan (mountains)
*Picea mariana*—black spruce, northern North America
*Picea meyeri*—Meyer's spruce, northern China (from Inner Mongolia to Gansu)
*Picea obovata*—Siberian spruce, north Scandinavia, Siberia
*Picea omorika*—Serbian spruce, Serbia and Bosnia
*Picea pungens*—blue spruce or Colorado spruce, Rocky Mountains, North America
*Picea retroflexa*—green dragon spruce, China
*Picea rubens*—red spruce, northeastern North America
*Picea sitchensis*—Alaska spruce In particular, the spruce is selected from Norway spruce (*Picea abies*) or Siberian spruce (*Picea obovata*) or black spruce (*Picea mariana*), blue spruce (*Picea pungens*), or red spruce (*Picea rubens*).

In one embodiment, the wood object to be treated can be in the form of a log or lumber or any sawn or otherwise mechanically processed form, such as a panel.

In particular, the wood object is selected from the group of logs, sawn timber, sawn wood, lumber, boards and veneer.

However, the present method can also be used directly on wood products, as the ones that will be listed below. For example, it is possible to treat plywood and similar multi-layered wood products.

The present wood objects can, typically after drying, be used for making various wood products, for example constructional wood products.

In the present context, the term "wood product" refers to any structure or article which comprises wood material for example in the form of mechanically produced massive structures, layers, chips or shavings and used as such or shaped into a secondary structure comprising in particular layers (veneer), chips or shavings glued together.

The wood products can be selected from the group of engineered wood products and multilayered wood products and panels. Examples include cross-laminated timber, laminated veneer lumber, wood-plastic composites and plywood as well as other wood based boards and panels, such as particle board, fiber boards, including medium and high density fiber boards, and orientated strand boards.

Thus, in one embodiment, the wood objects comprise or are used for manufacturing engineered wood products, cross-laminated timber, laminated veneer lumber, wood-plastic composites and plywood as well as other wood based boards, such as particle board, fiber board, orientated strand board and acoustic boards.

Further, the present compositions and methods can be used for treating acoustic boards, which at least partially are composed of wood material, for example in the form of fibrillated fibers. which optionally may be obtained from recycled wood fibers.

The present compositions and methods can also be used for modifying materials which contain cellulose-based substances, such as cellulose derivatives. Thus, the present compositions can be admixed with carboxymethyl cellulose to provide compositions which can be used as an adhesive for paper products, such as wall-papers, for cardboard products, such as corrugated cardboards, and for multilayered wood products, such as panels and boards. The modified cellulose derivatives can be used, generally, as viscosity modifiers and thickeners.

The wood treatment agent according to the invention may be used for the protection of wood against one, or simultaneously against several detrimental environmental factors. Said factors besides fire mainly include mould, rot, blue stain, insect such as termites attacks on wood, dimensional changes, or a combination thereof due to environmental influence.

The composition may be tailored in correspondence with the respective protection needed and prioritized. Preferably, a composition simultaneously having sufficient activities against several different detrimental environmental influences is provided.

Based on the above, in one embodiment, a method of treating wood products to improve fire resistance thereof is provided. In one embodiment, the method comprises treating wet wood objects, such as spruce objects, with compositions comprising an aqueous solution of bisphosphonate selected from 1-hydroxyethane 1,1-diphosphonic acid, an alkanol amine, and optionally an alkaline agent, the composition having a pH in the range of 4.0 to 7.0 to impregnate the object with the compositions, and subjecting the object so obtained to drying to achieve aspiration of the pits of the wood object.

In one embodiment, the method comprises treating wet wood objects with compositions disclosed in any of
  Birgit Östman et al. "Innovative eco-efficient high fire performance wood products for demanding applications" (Final report for Vinnova-Tekes project Inno-FireWood. SP Wood Technology SP REPORT 2006: 30)].
  U.S. Pat. No. 8,361,210 B2 (Ahlnas & Kukkonen),
  U.S. Pat. No. 9,125,404 B2 (Vuori & Nissinen),
  FI 121917 B (Mertaniemi et al.) or
  FI 122723 B (Kukkonen, Nissinen & Aksela), or
  FI20175221.

In one embodiment at least 20 wt %, in particular at least 30 wt %, for example at least 40 wt % (and up to 85 to 95 wt %) of the fire retardant, in particular of a fire retardant of the above discussed kind comprising a bisphosphonate e.t. of the 1-hydroxyethane 1,1-diphosphonic acid kind in combination with an alkanol amine, and optionally an alkaline agent, is retained in the wood object after drying.

Typically, washing out of the fire retardant is small for example by rain is small which provides for long term protection of the treated wood object.

The method can be used for protecting wood not only against fire but also against mould, rot, blue stain, insect such as termite attacks on wood, dimensional changes, or a combination thereof due to environmental influence.

EXAMPLES

The following test solutions and fire retardant treatment have been carried out to illustrate the invention, but are not to be considered limiting of the scope of the invention.

Solution 1 (reference solution according to the U.S. Pat. No. 8,361,210 B2, Ahlnas & Kukkonen) comprised the following components mixed together:
  49.2 wt-% HEDP acid (60 wt-% solution) i.e. 29.5 wt-% HEDP;
  10 wt-% 2-hydroxyethylammonium formate i.e. monoethanolammoniumformate i.e. ammonium carboxylate;
  20.6 wt-% ammonia water (24.5 wt-%);
  3.6 wt-% ionic tenside; and
  The 16.6 wt-% water.
  pH of the solution was 5.8 measured directly from the solution.

An amount of 250 g/m² of the solution 1 was applied onto surface of plywood board made of spruce.

Solution 2 (solution of the invention) comprised the following components mixed together:
- 60.8 wt-% HEDP acid (60 wt-% solution) i.e. 36.5 wt-% HEDP;
- 5.8 wt-% monoethanolamine;
- 23.4 wt-% ammonia water (24.5 wt-%);
- 3.5 wt-% ionic tenside; and
- 5.5 wt-% water pH of the solution was 6.2 measured directly from the solution.

An amount of 250 g/m² of the solution 2 was applied onto surface of plywood board made of spruce.

Solution 3 (solution of the invention) comprised, mixed together, the following components:
- 60.8 wt-% HEDP acid (60 wt-% solution) i.e. 36.5 wt-% HEDP;
- 5.8 wt-% monoethanolamine;
- 24.2 wt-% ammonia water (24.5 wt-%);
- 3.5 wt-% ionic tenside; and
- 4.7 wt-% water pH of the solution was 5.5 measured directly from the solution.

An amount of 250 g/m² of the solution 3 was applied onto surface of plywood board made of spruce.

Solution 4 (solution of the invention) comprised, mixed together, the following components:
- 60.8 wt-% HEDP acid (60 wt-% solution) i.e. 36.5 wt-% HEDP;
- 5.8 wt-% monoethanolamine;
- 20.0 wt-% ammonia water (24.5 wt-%);
- 3.4 wt-% ionic tenside; and
- 9.0 wt-% water.

pH of the solution was 5.2 measured directly from the solution.

An amount of 257 g/m² of the solution 4 was applied onto surface of plywood board made of spruce. The treatment was made using existing commercial surface treatment equipment at the plywood factory.

Solution 5 (reference solution):
- 89.29 wt-% Cublen K 3543 (an ammonium salt of HEDP acid, pH=7.0); and
- 10.71 wt-% HEDP acid (60 wt-% solution).

pH of the solution was 5.58 measured directly from the solution

Cublen K 3543 solution was bought from Oy Celego Ab, Finland.

The total amount of HEDP acid (as 100-wt %) of Solution 5 is 34.82 wt-%.

Solution 6 (solution according to invention) comprised, mixed together, the following components:
- 77.52 wt-% Cublen K 3543 (an ammonium salt of HEDP acid, pH=7.0);
- 18.60 wt-% HEDP acid (60 wt-% solution); and
- 3.88 wt-% monoethanolamine.

pH of the solution was 5.58 measured directly from the solution.

Cublen K 3543 solution was bought from Oy Celego Ab, Finland.

The total amount of HEDP acid (as 100-wt %) of the Solution 6 is 35.81 wt-%.

Solution 7 (reference solution according to the U.S. Pat. No. 8,361,210 B2, Ahlnas & Kukkonen):
- 80.65 wt-% Cublen K 3543 (an ammonium salt of HEDP acid, pH=7.0);
- 9.68 wt-% HEDP acid (60 wt-% solution); and
- 9.68 wt-% wt-% 2-hydroxyethylammonium formate i.e. monoethanolammoniumformate i.e. ammonium carboxylate.

pH of the solution was 5.71 measured directly from the solution.

Cublen K 3543 solution was bought from Oy Celego Ab, Finland.

The total amount of HEDP acid (as 100-wt %) of the Solution 7 is 31.45 wt-%.

Example 1—Emission Measurement [Research Report No. VTT-S-00351-17 & Työterveyslaitos Report 338763]

Standard References:
1. Protocol for Chemical and Sensory Testing of Building Material. Version 22.1.2015 (www.rts.fi)
2. SFS-EN SIO 16000-9 Determination of the emissions of volatile organic compounds from building products and furnishing. Emission test chamber method.
3. ISO 16000-6 Determination of volatile organic compounds in indoor and test chamber air by active sampling on Texax-TA sorbent, thermal desorption and gas chromatography using MS or MS-FID.
4. EN 717-1 Wood based panels—Determination of formaldehyde release—Parts 1: Formaldehyde emissions by chamber method October 2004.
5. In-house method. Determination of formaldehyde using spectrometric acetylacetone-method.
6. In-house method. Determination of ammonium concentration in indoor air (VTT).
7. In-house method AR2303-TY-015, modified from OSHA ID-188 Determination of ammonium concentration in indoor air (Työterveyslaitos).

Emission measurements of volatile organic compound (VOC, TVOC), carcinogens, ammonia, and formaldehyde of the fire retardant treated plywood were performed for the test specimens conditioned for four weeks at standard conditions [1]. The temperature was 23° C. and RH was 50%.

VOCs were adsorbed on Texax TA absorbent [2]. VOC samples were analyzed with a gas chromatograph after thermal desorption [3]. The gas chromatograph is equipped with a flame ionisation deterteot (FID) and a mass selective detector (MSD).

The total amount of VOCs (TVOC) was determined summing the individual concentration of identified and unidentified compounds eluting from a gas chromatographic column between hexane and hexadecane inclusively, at concentration above 5 ug/m³ in model room, all calculated as toluene equivalent. Single VOVs were identified from the mass selective detector total ion chromatogram using Wiley 275 spectral library and quantified from the FID-chromatogram as toluene equivalents. Formaldehyde and ammonia were absorbed in dilute sulphuric acid. Formaldehyde was analyzed spectrophotometrically with acetylacetone method [4-5]. Ammonia was analyzed potentiometrically with ammonia specific electrode [6-7].

TABLE 1

Results of the emission measurements

| | TVOC mg/(m²h) | Formaldehyde mg/(m²h) | Ammonia mg/(m²h) | Carsinogens mg/(m²h) |
|---|---|---|---|---|
| Solution 1 | NA | NA | 0.107 | NA |
| Solution 2 | NA | NA | 0.078 | NA |

TABLE 1-continued

Results of the emission measurements

| | TVOC mg/(m²h) | Formaldehyde mg/(m²h) | Ammonia mg/(m²h) | Carsinogens mg/(m²h) |
|---|---|---|---|---|
| Solution 3 | NA | NA | 0.028 | NA |
| Solution 4 | 0.019 | <0.005 | 0.008 | <0.001 |
| M1 classification criteria | <0.2 | <0.05 | <0.03 | <0.005 |

All solutions according to the invention show lower ammonia release rate than the reference solution. Results are surprising. The test solutions according to the invention have the same (test solution 4) or even higher amount of ammonia water (test solutions 1-3) than the test solution 1 (reference solution). Therefore it should be expected that the ammonia release is higher in the solutions according to the invention than in the reference solution. According to the open literature, the higher the amount of ammonia is and the higher pH of the solution is, the emissions of ammonia are higher.

Example 2—Fire Resistance Testing According to EN-ISO 5660-1:2002

The test specimens were conditioned at a room temperature of 23° C. and a relatively humidity of 50% to constant mass before tests. The ignition time and the maximum heat release rate of the test specimens in cone calorimeter tests at an irradiance of 50 kW/m² are shown in Table 2.

TABLE 2

Results of fire tests according to EN-ISO 5660-1:2002

| | Ignition time, s | Maximum heat release rate, kW/m² |
|---|---|---|
| Solution 1 | 32.9 | 129.6 |
| Solution 3 | 70.5 | 86.1 |

The solution 3 according to the invention remarkably increased the fire resistance of the treated plywood.

Example 3—Determination of the Reaction to Fire Performance According to EN 13823:2010 and Classification of Reaction to Fire in Accordance with EN 13501-1:2007+A1:2009 [Classification Report No. VTT-S-03751-16]

Spruce plywood treated with solution according to the invention was fire tested and fire classified with 35 . . . 40 mm airgap. The thickness of the plywood was 15 mm and the retention of the fire retardant was 240 g/m². The product achieved B-s1, d0 classification. Open literature does not mention or know any wooden material that has been surface treated with fire retardant solution i.e. liquid which will achieve B-s1, d0 classification with an airgap. Typically airgap drops the fire class from B to C.

Example 4—Long Term Storage Stability

The solutions 2, 3 and 4 according to the invention were storaged at normal room conditions over 1 year and no precipitate formation was observed. The results are surprising because it was expected that precipitate formation would be observed especially in case of test solutions 3 and 4, where the pH value of the solutions is less than 6.0.

The solutions 5, 6 and 7 were produced on 30 Dec. 2016 and storaged at the temperature of +12° C. for 50 days. The solution 6 (pH=5.58) according to the invention was totally clear and homogeneous whereas the reference solutions 5 (pH=5.58) and 7 (pH=5.71) contained a lot of crystals and precipitates and were hazy. Moreover even when the solutions 5 and 7 were warmed to the temperature of 50° C. for two hours the crystals and precipitated of the solutions did not dissolve into the solutions.

Example 5—the Effect of a Fire Retardant on the Corrosion Resistance of Fasteners [Research Report No VTT-S-00090-17]

The effect of the fire retardant on the corrosion resistance of fasteners in the service classes 1, 2 and 3 of standard EN 1995-1-1:2004 was investigated. Four spruce plywood samples were surface treated with a fire retardant (solution 4, retention 257 g/m²) and two reference plywood samples without any treatment with no additional treatment were used in the tests. Carbon steel nails without any coating, with zinc electroplating and hot dip galvanizing were used as a fasteners. Samples were tested in a condense test according to standard SFS-EN ISO 6270. The test duration was as follows: 5 days condensation (T=40° C., humidity=100% RH) followed by two days setting (chamber door closed, heating off). Two similar this kind of cycles were carried out, one simulating environment class 1 and one simulating class 2.

According to the results uncoated, zinc electrocoated and hot dip galvanized nails corroded slightly less in plywood treated with the fire retardant than in reference plywood without any treatments. In all service classes corresponding fasteners investigated can safely be used in connection of fireproofing treated plywood.

Results are surprising because it was expected to observe slight increased corrosion of fastens because test solution 4 has slightly acid pH value. Usually at low pH the corrosion is more severe.

Example 6—Fire Resistance Testing According to EN-ISO 5660-1:2002

The test solution no. 3 was used for testing the improvement of fire resistance of spruce. The test sample comprised panels of green spruce (i.e. undried spruce).

The following test procedure was followed:

First, the test specimens were immersed in solution no. 3 at room temperature overnight. Then the test specimens were dried overnight at 105° C. Finally, half of the test specimens were totally immersed in water for 3 days. During water immersion the wood treatment chemicals such as fire retardant typically leach out of the wood.

The ignition times and the maximum heat release rate of the test specimens before and after the leaching procedure at an irradiance of 50 kW/m2 and test time of 10 min are shown in Table 3. Fire resistance testing was carried out according to EN-ISO 5660-1:2002.

TABLE 3

| | Ignition time [s] | Maximum heat release rate [kW/m²] |
|---|---|---|
| Green spruce | 379 | 52.70 |
| Green spruce after leaching | 875.56 | 9.65 |

The results indicate that water immersion further improved water resistance. It is possible that some of the wood extractives are leached out whereas the fire retardant liquid was retained in the wood.

Example 7—Effect of the Wood Treatment Agent of the Invention on Cracking Spruce Timber Dimensional stability of green spruce timber immersed with solution No. 3 of the invention was tested and evaluated by visual inspection. No cracking was found in the green spruce panel immersion treated with the treatment solution after drying at 105° C. overnight.

INDUSTRIAL APPLICABILITY

The present technology can be applied to treatment of wood products in generally. Representative examples include, as discussed above, lumber, engineered wood products, such as cross-laminated timber, multiply products, such as laminated veneer lumber, Wood-plastic composites and plywood boards as well as other wood based boards, such as particle boards, fiber boards, orientated strand boards and acoustic boards, and cellulose-based fibers or materials, such as cellulose insulation materials. The present technology, methods and compositions, can also be used for modifying cellulose substances, such as cellulose derivatives, for example carboxymethyl cellulose, that can be used for example as adhesives in paper products, cardboard products and generally as a viscosity modifier and thickener.

Generally, wood product are provided which meet stringent requirements for fire protection, typically the present wood products meet fire class requirement according to B-s1, d0. 38. The present technology can also be used for protecting wood not only against fire but also, or alternatively, against mould, rot, blue stain, insect such as termites attacks on wood, dimensional changes, or a combination thereof due to environmental influence.

CITATION LIST

Patent Literature

U.S. Pat. No. 9,132,569 B2 (Saari)
U.S. Pat. No. 8,361,210 B2 (Ahlnas & Kukkonen)
U.S. Pat. No. 9,125,404 B2 (Vuori & Nissinen)
FI 121917 B (Mertaniemi et al.)
FI 122723 B (Kukkonen, Nissinen & Aksela)

Non-Patent Literature

Birgit Östman et al., "Innovative eco-efficient high fire performance wood products for demanding applications", Final report for Vinnova-Tekes project InnoFireWood. SP Wood Technology SP REPORT 2006:30, Stockholm 2006.
Wang et al. (2014). "Fire performance of plywood", BioResources 9(3), 4934-4945. ISO 5660-1:2015(en)—Reaction-to-fire tests.
Zschimmer & Schwarz Inc., Product Data Sheet for Cublen K60.
Research Report No VTT-S-00090-17.
Protocol for Chemical and Sensory Testing of Building Material. Version 22.1.2015 (www.rts.fi).
SFS-EN SIO 16000-9 Determination of the emissions of volatile organic compounds from building products and furnishing.
ISO 16000-6 Determination of volatile organic compounds in indoor and test chamber air by active sampling on Texax-TA sorbent, thermal desorption and gas chromatography using MS or MS-FID.
EN 717-1 Wood based panels—Determination of formaldehyde release—Parts 1: Formaldehyde emissions by chamber method October 2004.
OSHA ID-188 Determination of ammonium concentration in indoor air (Työterveyslaitos).

The invention claimed is:

1. A method of treating a wood object, comprising:
   treating the wood object as a wet wood object with an aqueous fire retardant composition to impregnate the wet wood object with the fire retardant composition; and
   subjecting the wet wood object thus treated to drying to achieve aspiration of the pits of the wet wood object,
   wherein the fire retardant composition comprises an aqueous solution of a mixture or a reaction product of 1-hydroxyethane-1,1-diphosphonic acid (HEDP) and an alkanol amine, and
   wherein at least 75 mole-% of the alkanol amine is added in free form when mixed or reacted with the 1-hydroxyethane-1,1-diphosphonic acid (HEDP).

2. The method according to claim 1, wherein the wood object has a water content of at least 40% of the wood's weight before being subjected to the treatment.

3. The method according to claim 1, wherein the wood object is selected from coniferous wood of the *Picea* species.

4. The method according to claim 1, wherein the wet wood object is green wood or a non-dried wood object.

5. The method according to claim 1, wherein the drying is carried out by subjecting the wood object to a temperature of more than 10° C. and less than 160° C. , and wherein the treated wet wood object is dried to a moisture content of less than 40% by weight of the wood object.

6. The method according to claim 1, wherein the wood object is impregnated with the aqueous composition to achieve a weight increase of at least 10% by weight.

7. The method according to claim 1, wherein the treated wood object is dried to achieve a percentage of closed bordered pits of at least 30%.

8. The method according to claim 1, wherein drying is carried out by maintaining a temperature difference between the interior temperature of the wood object and the surface temperature of the wood object of less than 30° C.

9. The method according to claim 1, wherein the impregnation of the wet wood object is carried out at conditions of pressure lower than 1 bar, and wherein the wet wood object is subjected to a pressure lower than 1 to remove air from the wet wood object during a first period of time and subsequently, during a second period of time, the aqueous fire retardant composition is applied onto the wet wood object.

10. The method according to claim 1, wherein the impregnation of the fire retardant composition into the wet wood object comprises subjecting the wood object to heating, incising, microwaving, plasma treatment, compression, steaming, micro-organisms, enzyme treatment, or chemical treatment, or in the case of plywood, increasing peeling checks during peeling of the veneers.

11. The method according to claim 1, wherein the fire retardant composition further comprises an alkaline agent, and wherein the fire retardant composition further comprises a pH in the range of 3.0 to 9.0.

12. The method according to claim 11, wherein the fire retardant composition comprises:

0.1 to 70% by weight of 1-hydroxyethane 1,1-diphosphonic acid, or a mixture of 1-hydroxyethane 1,1-diphosphonic acid and other bisphosphonic acids or bisphosphonates and/or other organic phosphonates, calculated from the amount of dissolved components of the composition, in the form of a salt of the alkaline agent; and 1 to 30% by weight of an alkanol amine or a mixture of alkanol amines, calculated from the amount of dissolved components of the composition.

13. The method according to claim 11, wherein the alkaline agent is provided in an aqueous solution, and wherein the alkaline agent is selected from the group consisting of calcium-free inorganic hydroxides and carbonates, ammonia, ammonium hydroxide and mixtures thereof, said alkaline agent being present in an amount of 0.1 to 40% by weight of the solution.

14. The method according to claim 11, wherein the alkaline agent is ammonia and is added in the form of aqueous solution of 1 to 25% by weight of ammonia in water.

15. The method according to claim 1, wherein at least 50 mole-% of the 1-hydroxyethan-1,1-diphosphonic acid (HEDP) is beng present in acid form.

16. The method according to claim 1, wherein the fire retardant composition comprises 0.1 to 50%, by weight of 1-hydroxyethane 1,1-diphosphonic acid optionally in mixture with other bisphosphonates or organic phosphonates or the mixtures thereof, calculated from the amount of the dissolved components of the composition.

17. The method according to claim 14, wherein alkanol amine is selected from amines having the formula:

NR$^1$R$^2$R$^3$     I wherein

R$^1$, R$^2$ and R$^3$ are independently selected from hydrogen and alkyl having 1 to 6 carbon atoms and optionally substituted with at least one substituent selected from hydroxyl groups, mono-, di- and tri-alkanol amines, the mono-, di- and tri-alkanol amines selected from the group consisting of monoethanolamine, monoisopropanolamine, mono-sek-butanolamine, diethanolamine, di-isopropanolamine, di-sek-butanolamine, triethanolamine, tri-isopropanolamine, and mixtures thereof.

18. The method according to claim 1, wherein the fire retardant composition comprises 10 to 35% by weight of water.

19. The method according to claim 1, wherein the fire retardant composition comprises, calculated from the dry weight of the fire retardant composition:

30 to 50 parts by weight of 1-hydroxyethane 1,1-diphosphonic acid 1 to 10 parts by weight of an alkanol amine or mixture thereof, said alkanol amine being added in free form;

0.1 to 40 part by weight of an alkaline agent parts by weight of ammonia; and water.

20. The method according to claim 1, wherein comprising the treating of the wood comprises applying onto the wood object, 10 to 500 g/m$^2$ of the fire retardant composition.

21. The method according to claim 1, wherein the wood object is selected from the group consisting of logs, sawn timber, sawn wood, lumber, boards, and veneer.

22. The method according to claim 1, wherein the wood object comprises or is used for manufacturing engineered wood products, cross-laminated timber, laminated veneer lumber, wood-plastic composites, plywood, particle board, fiber board, orientated strand board, or acoustic boards.

23. The method according to claim 1, wherein at least 20 wt % of the fire retardant is retained in the wood object after drying.

24. The method according to claim 1, wherein the process provides for the protection of the wood object against one, or simultaneously against several detrimental environmental factors, said factors being, besides fire, mould, rot, blue stain, insects, dimensional changes, or a combination thereof due to environmental influence.

* * * * *